Jan. 5, 1926.
H. S. JANDUS
BUMPER
Filed March 31, 1924
1,568,558
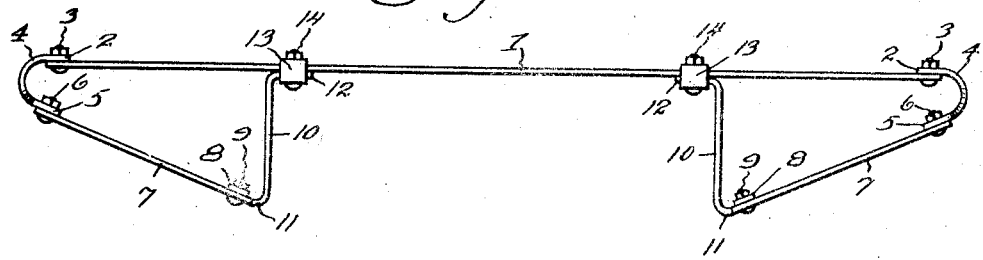
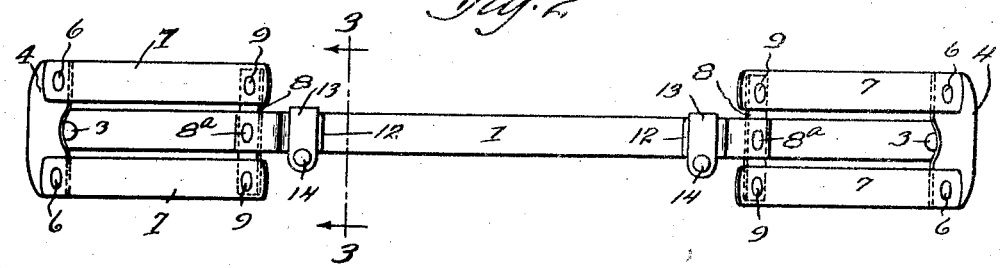
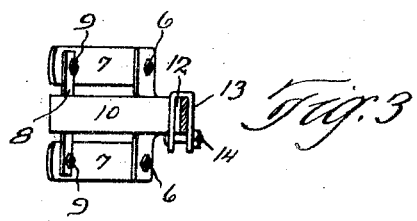

Patented Jan. 5, 1926.

1,568,558

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

BUMPER.

Application filed March 31, 1924. Serial No. 703,027.

*To all whom it may concern:*

Be it known that I, HERBERT S. JANDUS, a citizen of the United States, residing at Detroit, in the county of Wayne and State of Michigan, have invented a certain new and useful Improvement in Bumpers, of which the following is a full, clear, and exact description, reference being had to the accompanying drawings.

This invention relates to bumpers, and more particularly to combined bumpers and fender guards, adapted to be applied to the rear ends of automobiles and similar vehicles.

The invention disclosed herein is embodied in a bumper and fender guard wherein a space or pocket is provided between the body of the bumper and the fender-guard portions thereof for the reception of a spare tire, an instance of this type of bumper being shown in Patent No. 1,476,605, issued December 4, 1923, to Christian Girl and Wayne E. Dunston.

It is the general purpose and object of the invention to provide a combined bumper and fender guard of the foregoing type which shall be simple in construction and inexpensive of production, and one wherein the ends of the fender-guard portions of the bumper will be resiliently supported, thereby increasing the efficiency of such portions.

I accomplish the foregoing objects in and through the construction shown in the drawings forming part hereof wherein Fig. 1 represents a plan view of a bumper embodying my invention; Fig. 2, an elevation of said bumper, and Fig. 3, a sectional detail corresponding to line 3—3 of Fig. 2.

Describing the parts by reference characters, 1 denotes what will be the front bar of the bumper when in position upon the rear of an automobile. This bar is shown as substantially straight, or unformed, and is of sufficient length to extend across the rear and the fenders of an automobile. Connected to each end of the bar 1 is a loop, said loops being preferably stamped from sheet metal and each having a narrow end 2 secured, as by a bolt 3, to the appropriate end of the bar 1. Each loop also has a widened U-shaped body portion 4 terminating in upper and lower ears 5 connected each by a bolt 6 with the outer ends of an upper and lower bar 7, the said bars being arranged respectively above and below the bar 1.

The bars 7 are preferably straight from end to end and have their rear ends connected by means of a vertical strap or plate 8 and bolts 9. The inner and rear ends of the bars 7 are connected to and spaced from the bar 1 by means of straps or plates 10, each having its body extending at right angles to the plate 1 and having an outer end 11 bent outwardly and forwardly and connected to the plate or strap 8, as by a rivet 8ª, the inner end of each connecting plate or strap being bent inwardly, as shown at 12, whereby it is adapted to bear against the rear of the bar 1, being secured thereto by means of the inverted U-shaped clamps 13 and bolts 14.

By the construction shown and described herein, the back bars 7 are resiliently supported from the corresponding portions of the bar 1 by means of resilient connections at the points 4 and 10, whereby the fender-protecting portions of the bumper are adapted to receive and withstand blows of considerable force without serious injury to the bumper and to the parts engaged and protected thereby.

By using the straight or unformed plates 1 and 7 and connecting them in the manner shown herein, the bumper as a whole is capable of quantity production at a cheap price, it being unnecessary to perform any special forming operations upon the said bars, and the bumper thus formed being capable of being plated in a simple and inexpensive manner. Further, by varying the lengths of the parts 10 of the connecting members, the depth of the pocket provided between the inner ends of the bars 7 and the body of the bar 1 can be varied to accommodate one or more tires, according to requirements.

Having thus described my invention, what I claim is:—

1. A bumper comprising a bar adapted to extend across the rear of the vehicle, resilient loop members connected to the ends of said bar, a bar connected to the rear end of each of said loop members and extending inwardly therefrom, and means connecting the inner ends of the last-mentioned bars to the first-mentioned bar at points spaced from the center of the first mentioned bar.

2. A bumper comprising a bar adapted to extend across the rear end of a vehicle, resilient loop members connected to the ends of said bar, a relatively short straight bar connected to the rear end of each of said members and extending inwardly and rearwardly therefrom, and means connecting the inner ends of the last-mentioned bars to the first-mentioned bar at points remote from the center of such first mentioned bar thereby to provide a space at the rear of the first mentioned bar for the reception of a tire.

3. A bumper comprising a bar adapted to extend across the rear of a vehicle, resilient loop members connected to the ends of said bar, a relatively short bar connected to the rear end of each of said loop members and extending inwardly therefrom, and resilient means connecting the inner ends of the last-mentioned bars to the first-mentioned bar at points remote from the center of such first-mentioned bar.

4. A bumper comprising a bar adapted to extend across the rear end of a vehicle, resilient loop members connected to the ends of said bar, one or more straight bars connected to the rear ends of said members and extending inwardly and rearwardly therefrom, and resilient means connecting the inner ends of the last-mentioned bars to the first-mentioned bar at points remote from the center of such first-mentioned bar.

5. A bumper comprising a bar adapted to extend across the rear of a vehicle, one or more relatively short bars extending rearwardly and inwardly from each end of the first-mentioned bar, means resiliently connecting the outer ends of the last-mentioned bars to the corresponding ends of the first-mentioned bar, and means for connecting the inner ends of the second-mentioned bars to the first-mentioned bar at points remote from the center of the first-mentioned bar thereby to provide a space or pocket for the reception of a tire at the rear of said first-mentioned bar.

6. A bumper comprising a bar adapted to extend across the rear end of a vehicle, one or more relatively short straight bars extending rearwardly and inwardly from each end of the first-mentioned bar, means resiliently connecting the outer ends of the last-mentioned bars to the ends of the first-mentioned bar, and means for connecting the inner ends of the second-mentioned bars to the first-mentioned bar at points remote from the center of the first-mentioned bar thereby to provide a space or pocket for the reception of a tire at the rear of said first mentioned bar.

7. A bumper comprising a bar adapted to extend across the rear of a vehicle, one or more relatively short bars extending inwardly and rearwardly from each end of the first-mentioned bar, means resiliently connecting the outer ends of the second bars to the corresponding ends of the first-mentioned bar, and means resiliently connecting the inner ends of such bars to the portions of the first bar adjacent thereto.

8. A fender guard comprising a bar adapted to extend across a fender, one or more relatively short bars extending rearwardly and inwardly from an outer end of the first-mentioned bar, means resiliently connecting the outer ends of said bars, and means resiliently connecting the inner end or ends of the second bar or bars to the portion of the first-mentioned bar adjacent thereto.

9. A vehicle guard comprising a bar adapted to extend across a fender, one or more relatively short straight bars extending rearwardly and inwardly from an outer end of the first-mentioned bar, means resiliently connecting the outer ends of said bars, and means resiliently connecting the inner end or ends of the second bar or bars to the portion of the first mentioned bar adjacent thereto.

10. A fender guard comprising a bar adapted to extend across a fender, a looped member connected at one end to the outer end of such bar and having an intermediate vertically widened portion, a pair of bars connected at their outer ends to the rear end of such member, and means connected to the inner ends of the last-mentioned bars and resiliently spacing the same from the first-mentioned bar.

11. A fender guard comprising a bar adapted to extend across a fender, a looped member connected at one end to the outer end of such bar and having an intermediate vertically widened portion, a pair of straight bars connected at their outer ends to the rear end of such member and extending inwardly and rearwardly therefrom, and means connected to the inner ends of the last-mentioned bars and resiliently spacing the same from the first-mentioned bar.

In testimony whereof, I hereunto affix my signature.

HERBERT S. JANDUS.